United States Patent [19]

Kanno

[11] Patent Number: 5,040,232

[45] Date of Patent: Aug. 13, 1991

[54] INFORMATION PROCESSING APPARATUS USING A DATA FORMAT CONVERTER

[75] Inventor: Masayuki Kanno, Fujisawa, Japan

[73] Assignee: Kabushiki Kaisha Toshiba, Kawasaki, Japan

[21] Appl. No.: 240,656

[22] Filed: Sep. 6, 1988

[30] Foreign Application Priority Data

Sep. 7, 1987 [JP] Japan .................. 62-223302
Sep. 7, 1987 [JP] Japan .................. 62-223303

[51] Int. Cl.$^5$ ............................. G06K 9/32
[52] U.S. Cl. ..................... 382/44; 382/65; 382/13; 382/59
[58] Field of Search ............ 382/44, 45, 46, 47, 382/65, 13, 59, 58, 61; 358/452, 453, 448, 450; 364/900, 518

[56] References Cited

U.S. PATENT DOCUMENTS 4,656,602 4/1987 Berkland et al. ............... 364/900
4,661,988 4/1987 Shimizu ........................ 382/65

FOREIGN PATENT DOCUMENTS

3121503A1 5/1980 Fed. Rep. of Germany .

OTHER PUBLICATIONS

An Office Action from German Patent Office (in German language).
English Translation of Office Action from German Patent Office.

*Primary Examiner*—Michael Razavi
*Attorney, Agent, or Firm*—Finnegan, Henderson, Farabow, Garrett, and Dunner

[57] ABSTRACT

An information processing apparatus includes a scanner for scanning image information on an original and outputting byte-by-byte data with the left end of the original being defined as the most significant bit, MSB, and an optical disk that treats the left end of the original as the least significant bit, LSB. In writing the information scanned by the scanner on the optical disk, this information is supplied to a bit converter which converts a bit alignment of one-byte information from the MSB to the LSB into a bit alignment from the LSB to the MSB. The converted data is supplied to, and stored in, the optical disk.

5 Claims, 11 Drawing Sheets

| DEVICE NAME | | DEFINITION OF LEFT END BIT | A SYSTEM (LSB ON LEFT END) | B SYSTEM (MSB ON LEFT END) |
|---|---|---|---|---|
| SCANNER | | MSB | BIT CONVERTED | NO BIT CONVERSION |
| PRINTER | | MSB | BIT CONVERTED | NO BIT CONVERSION |
| FAX | | LSB | NO BIT CONVERSION | BIT CONVERTED |
| LAN TERMINAL | | MSB | BIT CONVERTED | NO BIT CONVERSION |
| PERSONAL COMPUTER | | MSB | BIT CONVERTED | NO BIT CONVERSION |
| HOST COMPUTER | | LSB | NO BIT CONVERSION | BIT CONVERTED |
| OPTICAL DISK | COMPANY A | LSB | NO BIT CONVERSION | BIT CONVERTED |
| | COMPANY B | MSB | BIT CONVERTED | NO BIT CONVERSION |

F I G. 2

| BIT CONVERSION SIGNAL | ADDRESS OF ROM AREA | DATA (HEX) |
|---|---|---|
| 0 (NO BIT CONVERSION) | 00<br>01<br>02<br>03<br>⋮<br>FD<br>FE<br>FF | 00<br>01<br>02<br>03<br>⋮<br>FD<br>FE<br>FF |
| 1 (BIT CONVERSION) | 00<br>01<br>02<br>03<br>04<br>05<br>06<br>07<br>08<br>⋮<br>FD<br>FE<br>FF | 00<br>80<br>40<br>C0<br>20<br>A0<br>60<br>E0<br>10<br>⋮<br>BF<br>7F<br>FF |

F I G. 4

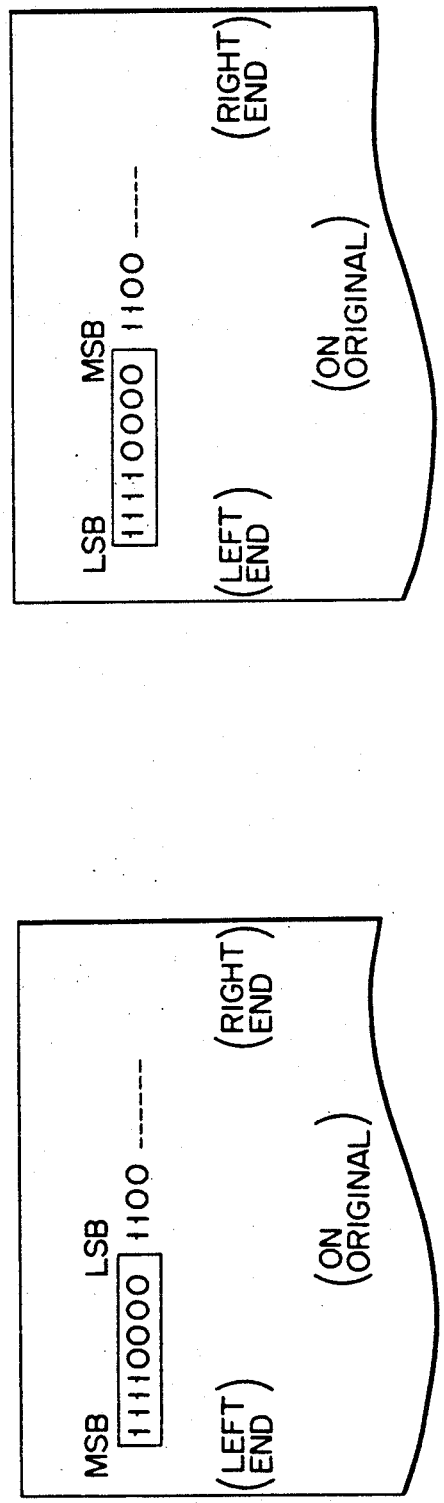
FIG. 5A    FIG. 5B
FIG. 6A    FIG. 6B

INFORMATION PROCESSING APPARATUS USING A DATA FORMAT CONVERTER

BACKGROUND OF THE INVENTION

1. Field of the Invention processing apparatus which executes recording, retrieval and/or communication of image information, for example.

2. Description of the Related Art

Recently, information processing apparatuses have been put to practice, which execute optical twodimensional scanning of a vast amount of image information such as text with a two-dimensional scanner, store the information on an optical disk, and retrieve and read out any desired image information from the optical disk. This type of information processing apparatus is disclosed in, for example, U.S. Pat. 4,661,988 issued to Shimizu.

With such a processing apparatus, desired text is edited by rotating and/or enlarging or reducing retrieved image information (or some text), or cutting and pasting the information to another text. The edited text is sequentially stored on a recording medium, for example, an optical disk, or is sent to an output device, such as a CRT display or a printer, for visual confirmation.

In this processing apparatus, the left end of an original is defined as the most significant bit, MSB, and every one-byte data is written at it is in a page memory and a recording medium such as an optical disk memory. In reading out stored information from the recording medium, the display, output, transmission, reception, edition, etc. of information is executed without inconsistency by simply treating the MSB as the left end of the original, as per the above data writing process. This means that this information processing apparatus is of a stand-alone and closed type.

There is another type of information processing apparatus which, unlike the above type, defines the left end of an original as the least significant bit, LSB, and stores every one-byte data, as it is, in a page memory and a recording medium such as an optical disk memory. As system composite, networking and systematization are being developed, there is a demand for an open type information processing system which can communicate with the apparatuses of the above specification and an apparatus which uses an optical disk from a different company or a new type of optical disk that is of a different specification.

For communication systems such as a facsimile, the communication standards include transmitting data from its LSB. With the aforementioned apparatus in which the left end of an original is defined as the MSB, however, data is transferred from the MSB even at the time of data communication. In the case where data communication involves different types of apparatuses tha employ different types of bit definitions (MSB and LSB for the left end of an original), therefore, complex data processing is required to ensure the data communication, the bit arrangement of data does not coincide with its address in a bit map memory, and the MSB type apparatus does not conform to the standards of communication systems.

That is, as described above, the prior art information processing apparatuses are of a stand-alone and closed type and are designed in such a way that the left end of an original is defined as the MSB and data is transferred from the MSB even at the time of data communication. In the case where data communication involves MSB and LSB types apparatuses, therefore, complex data processing is required for the data communication, the bit arrangement of data does not coincide with its address in a bit map memory, and the MSB type apparatus does not conform to the standards of communication systems. Further, these prior art apparatuses do not have compatibility with other types of apparatuses, nor do they have expandability to permit connection to various types of communication devices.

SUMMARY OF THE INVENTION

Accordingly, it is an object of this invention to provide an information processing apparatus which can facilitate data processing, make the bit arrangement of data coincide with its address in a bit map memory, conform to the standards of communication systems, and keep compatibility with such a different type of apparatus and expandability to permit connection to various communication devices. To achieve the object, there are provided the following information processing apparatuses.

An information processing apparatus comprising:

interface means to which one of at least a first apparatus and a second apparatus is coupled selectively, the first apparatus having first storing means for storing information having units of data of a predetermined plurality of bits aligned in a first order and the second apparatus having second storing means for storing information having units of data of the predetermined plurality of bits aligned in a second order different from the first order;

means for discriminating between the first apparatus and the second apparatus selectively coupled to the interface means;

means for converting data aligned in the first order into data aligned in the second order; and control means for supplying the information having units of data aligned in the first order to the first storing means of the first apparatus via the interface means when the first apparatus is discriminated as being coupled to the interface means by the discriminating means, and supplying data converted by the converting means to the second storing mean of the second apparatus via the interface means when the second apparatus is discriminated as being coupled to the interface means by the discriminating means.

An information processing apparatus for transmitting information including a plurality of units of data of a predetermined plurality of bits to an external unit, the external unit having control means for treating the data of the predetermined plurality of bits as being aligned in a first order, and the information processing apparatus comprising:

control means for treating the data of the predetermined plurality of bits as being aligned in a second order different from the first order;

means for storing information having units of data of the predetermined plurality of bits aligned in the second order;

means for transmitting the information stored in the storing means to the external unit;

means for converting data aligned in the second order in information to be transmitted into data aligned in the first order; and means for supplying information having units of data converted by the converting means to the transmitting means.

An information processing apparatus comprising:

first interface means to which one of at least a first apparatus and a second apparatus is coupled selectively, the first apparatus having first input means for inputting information having units of data of a predetermined plurality of bits in a predetermined first order and the second apparatus having second input means for inputting information having units of data of the predetermined plurality of bits in a predetermined second order different from the first order;

second interface means to which one of at least a third apparatus and a fourth apparatus is coupled selectively, the third apparatus having first output means for outputting information having units of data of the predetermined plurality of bits in the first order and the fourth apparatus having second output means for outputting information having units of data of the predetermined plurality of bits in the second order; and control means for receiving and subjecting information to a predetermined process, supplying processed information to the first output means of the third apparatus selectively coupled to the second interface means therethrough in units of data of the predetermined plurality of bits in the first order when the second apparatus is coupled to the first interface means and the third apparatus is coupled to the second interface means, and supplying the processed information to the second output means of the fourth apparatus selectively coupled to the second interface means therethrough in units of data of the predetermined plurality of bits in the second order when the first apparatus is coupled to the first interface means and the fourth apparatus is coupled to the second interface means.

An information processing apparatus comprising:

an information processing device having first processing means for processing data aligned in a first order; and an external device having second processing means for processing data aligned in a second order, and wherein the information processing device comprising:

means for discriminating that the first order is different from the second order;

means for converting the data aligned in the first order to the data aligned in the second order according to the result of the discrimination by the discriminating means; and means for outputting the data converted by the converting means from the information processing device to the external device.

BRIEF DESCRIPTION OF THE DRAWINGS

FIG. 2 is a diagram illustrating definitions of the left end bits for various devices for use in the embodiment shown in FIG. 1;

FIG. 4 is a diagram exemplifying bit conversion executed by the bit converter;

FIGS. 5A and 5B are diagrams illustrating data before and after bit conversion for explaining examples of bit conversion executed by the bit converter;

FIGS. 6A and 6B are diagrams explaining the most significant bit and the least significant bit on an original, respectively;

DETAILED DESCRIPTION OF THE PREFERRED EMBODIMENTS

Figure 1:
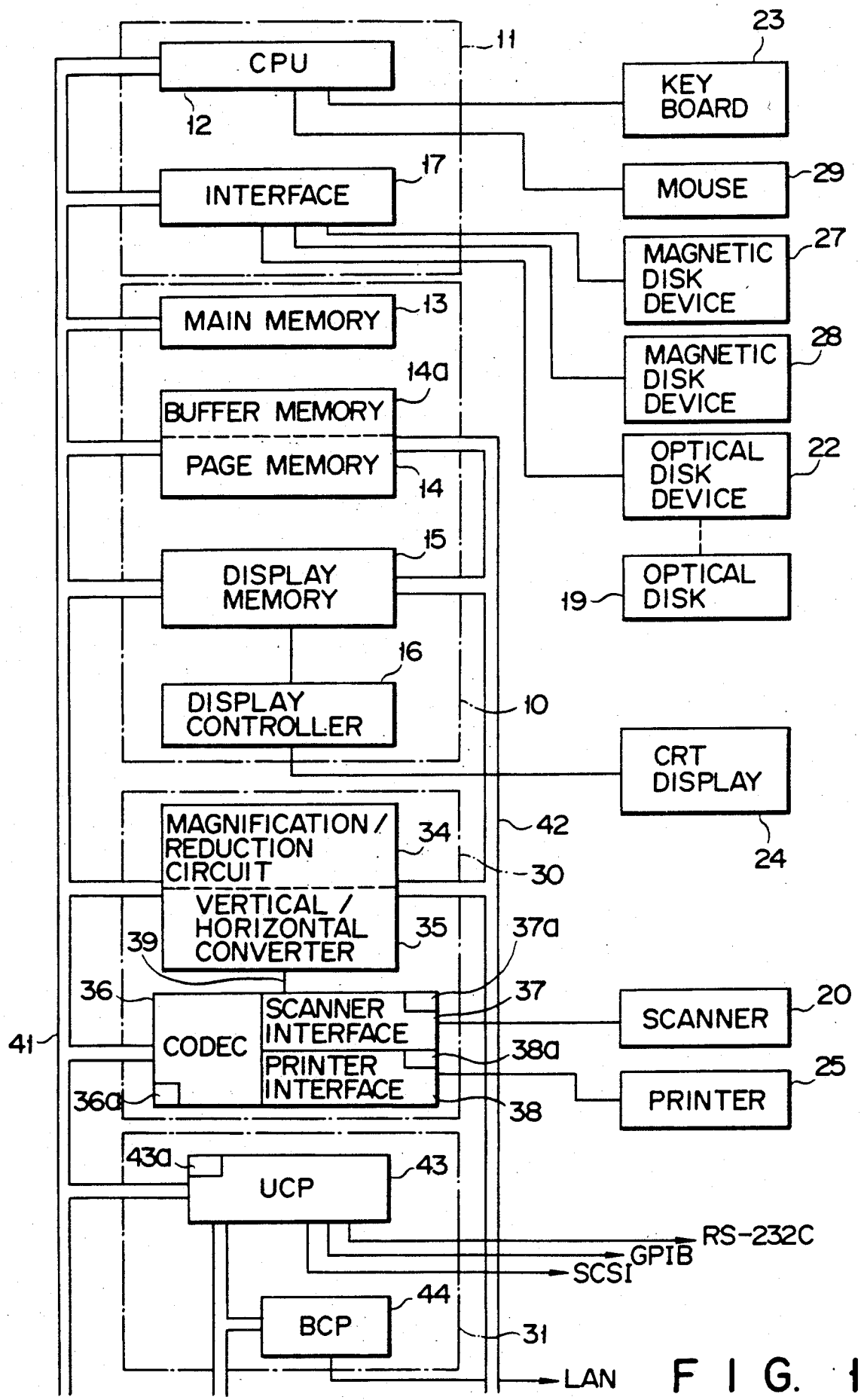
FIG. 1 is a schematic block diagram illustrating the general arrangement of an image information processing apparatus as one embodiment of an information processing apparatus according to this invention.

FIG. 1 illustrates an image information processing apparatus as one embodiment of an information processing apparatus of this invention. This processing apparatus comprises a memory module 10, a control module 11, a scanner 20, an optical disk device 22, a keyboard 23, a CRT display device 24, a printer 25, a magnetic disk device 27, a magnetic disk device 28, a so-called mouse 29 as a pointing device, an image processing module 30, a communication control module (communication control means) 31, a system bus 41, and an image bus 42.

The control module 11 comprises a CPU 12, which executs various controls and is serving as control means, discriminating means, or retrieving means, and an interface circuit 17, which serves to couple optical disk device 22 as an external device and magnetic disk devices 27 and 28 to CPU 12 and is serving as interface means or outputting means. CPU 12 is further coupled to keyboard 23 and mouse 29.

Memory module 10 comprises a main memory 13, a page memory 14 as an image memory which has a memory capacity for image data for several pages of A4-size originals, and a display memory 15 and a display controller 16 which are serving as interface means or outputting means. Page memory 14 has its part serving as a buffer memory 14a whose reading and writing operations are controlled by a counter that is not shown.

Image processing module 30 which is serving as processing means comprises a magnification/reduction circuit 34, a vertical/horizontal converter 35, a compressing/expanding circuit (hereinafter called CODEC) 36 as compressing or expanding means, a scanner interface 37 as interface means for scanner 20 as supplying means or input means, a printer interface 38 as interface means or outputting means for printer 25 as output means or an external device, and an internal bus 39. Magnification/reduction circuit 34 magnifies or reduces image information. Vertical/horizontal converter 35 performs vertical/horizontal conversion of image information to carry out rotation of the image information, 90-degree rotation (rightward 90-degree rotation), 180-degree rotation, and 270-degree rotation (leftward 90-degree rotation). CODEC 36 executes compression (reduction in redundancy) and expansion (restoring the reduced redundancy) of image information. Internal bus 39 couples magnification/reduction circuit 34 and vertical/horizontal converter 35 to CODEC 36, scanner interface 37, and printer interface 38.

Communication control module 31 has a UCP (Universal Communication Processor) 43 and a BCP (Bus Communication Processor) 44 which are serving as transmitting means, receiving means, interface means, or outputting means. This UCP 43 is coupled to external units such as an FCP (Facsimile Coupling Processor), which is not shown, and a personal computer through interfaces (RS-232C, GRIB, and SCSI) which are serving as input means, output means, or an external device. BCP 44 is coupled to LAN (Local Area Network) as input means output means, or an external device.

System bus 41 serves as a control signal bus that couples control module 11 to memory module 10, image processing module 30, and communication control module 31. Image bus 42 serves as an image information bus that couples memory module 10, image processing module 30, and communication control module 31 together.

Display memory 15 stores image information that is actually displayed within windows on CRT display device 24 as output means or an external device. In other words, this display memory 15 stores image Information that results from magnification, reduction, rotation, pasting, or monochromatic inversion, etc. of the image information stored in page memory 14.

CPU 12 outputs control signals to various components in accordance with data of machine structures, which is stored in advance in a ROM (not shown) of main memory 13. Assume that the machine structures are such that the overall apparatus is a system of company A which treats the left end bit as the least significant bit (LSB), an optical disk 19 which is serving as storing means, supplying means, input means, or output means is a product of company A, and scanner 20 and printer 25 are products of company B which treat the left end bit as the most significant bit (MSB). Then, the definitions of the left end bit for the various devices would be as is shown in FIG. 2. Specifically, Scanner 20 treats the left end bit as the MSB;

Printer 25 treats the left end bit as the MSB;

Optical disk 19 (product of company A) treats the left end bit as the LSB;

A LAN terminal treats the left end bit as the LSB;

A facsimile (FAX) and a host computer treat the left end bit as the LSB; and

A personal computer treats the left end bit as the MSB.

With the above definitions, therefore, bit conversion is effected in the system of company A as follows:

Data from scanner 20 is subjected to bit conversion;

Data associated with optical disk 19 is not subjected to bit conversion;

Data associated with the LAN terminal and personal computer is subjected to bit conversion, that is, bit conversion is executed in the GPIB and SCSI of the BCP and UCP; and DAta associated with the FAX and host computer is not subjected to bit conversion, that is, no bit conversion is effected in the RS-232C of the FCP and UCP.

Scanner 20 is a two-dimensional scanner, for example, and executes two-dimensional scanning of an original (text) with a laser beam to provide an electric signal corresponding to image information on the original. Optical disk device 22 sequentially stores on optical disk (data recording medium) 19 the image information scanned by scanner 20. Keyboard 23 is for entering specific retrieval codes for image information and various operation commands.

CRT display device 24, which is an output device, displays image information scanned by scanner 20 or that read out from optical disk 19 by optical disk device 22. The display device 24 can simultaneously display a maximum of four texts opening four windows. For instance, four pieces of top-to-bottom image information can be displayed in the respective windows and can be subjected to edition, such as image magnification, reduction, rotation, or scrolling, independently for the associated windows.

Printer 25 provides a print-out or hard copy of image information which is scanned by scanner 20, read out from optical disk 19, or displayed on CRT display device 24.

Magnetic disk device 27 is a hard disk device that stores a retrieval code (image name) entered through keyboard 23 and retrieval data on a magnetic disk (not shown) for every record of image information. The retrieval code includes a plurality of retrieval keys. The retrieval data includes a head track address on optical disk 19 for storing image information for one record corresponding to the retrieval code, a head sector address for storing the image information, a number of image storing sectors (the length of the image information), a size of the image information, a reading density, and a rotational direction.

Magnetic disk device 28 is a floppy disk device, for example. Mouse 29 serving as a pointing device is used to move a cursor on CRT display device 24 arbitrarily in the vertical or horizontal directions, and to select what is displayed at the cursor position (e.g., various modes, an editing image, the range for "cut and paste", and an icon) when given a command at the desired position.

CODEC 36 is provided with a bit converter 36a as conversion means or supplying means, and scanner interface 37 is provided with a bit converter 37a also as conversion means or supplying means. Similarly, printer interface 38 and UCP 43 are provided respectively with bit converters 38a and 43a as conversion means or supplying means.

Figure 3:
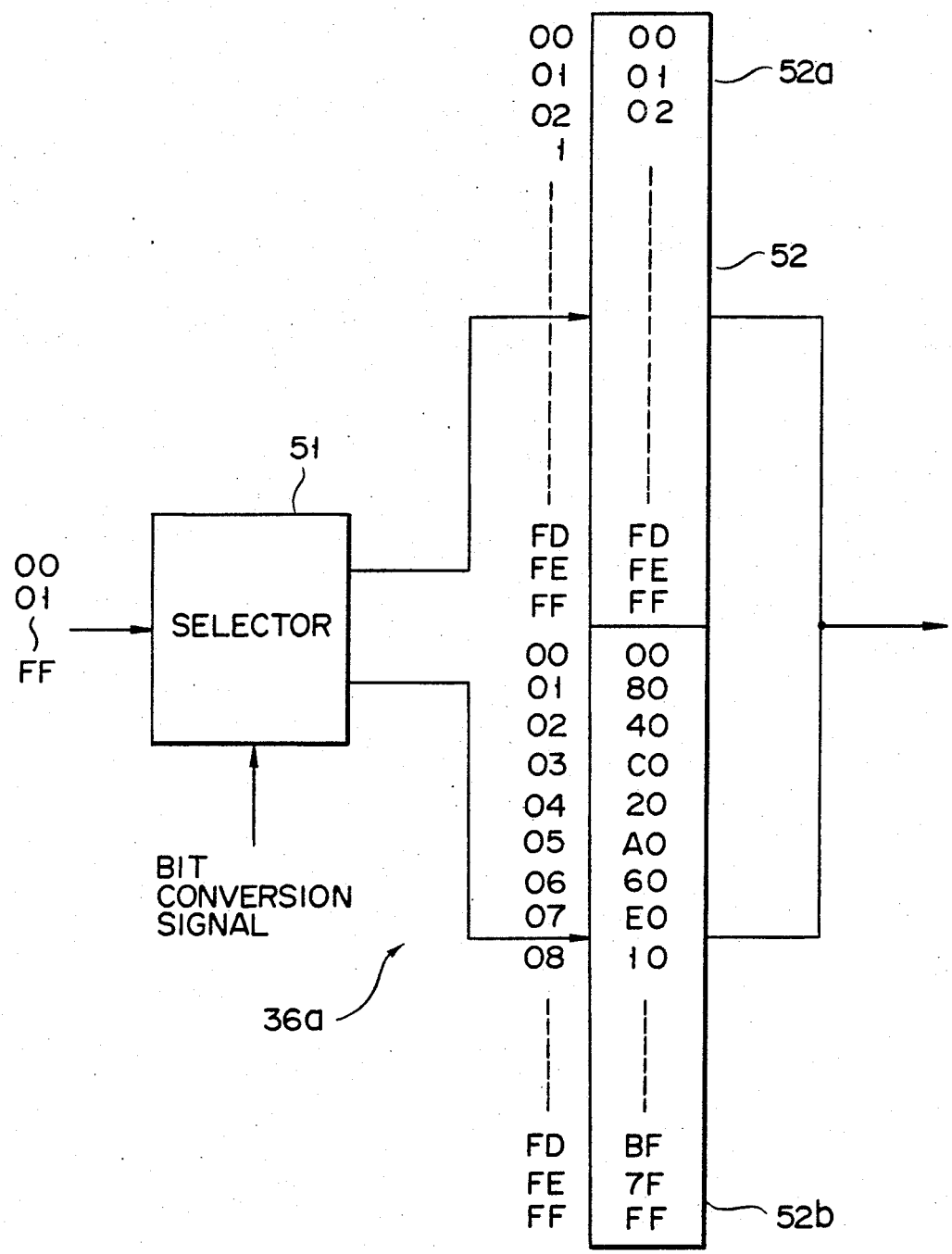
FIG. 3 is a block diagram illustrating the arrangement of a bit converter.

Each bit converter 36a, 37a, 38a, or 43a is constituted by a selector 51 and a ROM 52, as is shown in FIG. 3. Selector 51 supplies received data, as readout address data, to a memory area 52a of ROM 52 upon reception of a "0" signal from CPU 12 as a bit conversion signal, and supplies received data, as the readout address data, to a memory area 52b of ROM 52 upon reception of a "1" signal as the bit conversion signal from CPU 12.

More specifically, with the "0" signal being supplied as the bit conversion signal to selector 51, when to the address "00" is outputted from memory area 52a of ROM 52, as is shown in FIG. 4. Similarly, when selector 51 receives data "01", data "01" corresponding to the address "01" is outputted from memory area 52a, and when selector 51 receives data "FF", data "FF" corresponding to the address "FF" is outputted from memory area 52a.

With the "1" signal being supplied as the bit conversion signal to selector 51, when selector 51 receives data "00", data "00" corresponding to the address "00" is outputted from memory area 52b of ROM 52, when selector 51 receives data "01", data "80" corresponding to the address "01" is outputted from memory area 52b, and when selector 51 receives data "FF", data "FF" corresponding to the address "FF" is outputted from memory area 52b. Accordingly, for example, one word data "$^M1^S1^B1100^L0^S0^B$" (F0) having the MSB on the left end, as is shown in FIG. 5A, is converted by the associated bit converter into one word data "$M_1S_1{}^B1100{}^LOS_0{}^B$" (0F) having the LSB on the left end as is shown in FIG. 5B.

The number of pixels is set in CODEC 36 based on the center distribution to meet the standards of the CCIT (Comite Consultatif International Telegraphique et Telephonique). Bit conversion in bit converter 36a of CODEC 36 may be effected at the time of data input or at the time of data output.

According the image data expression of the system of company B, the left end on the screen is defined as the MSB, as is shown in FIG. 6A, and according to the image data expression of the system of company A, the left end is defined as the LSB, as is shown in FIG. 6B.

Figure 7:
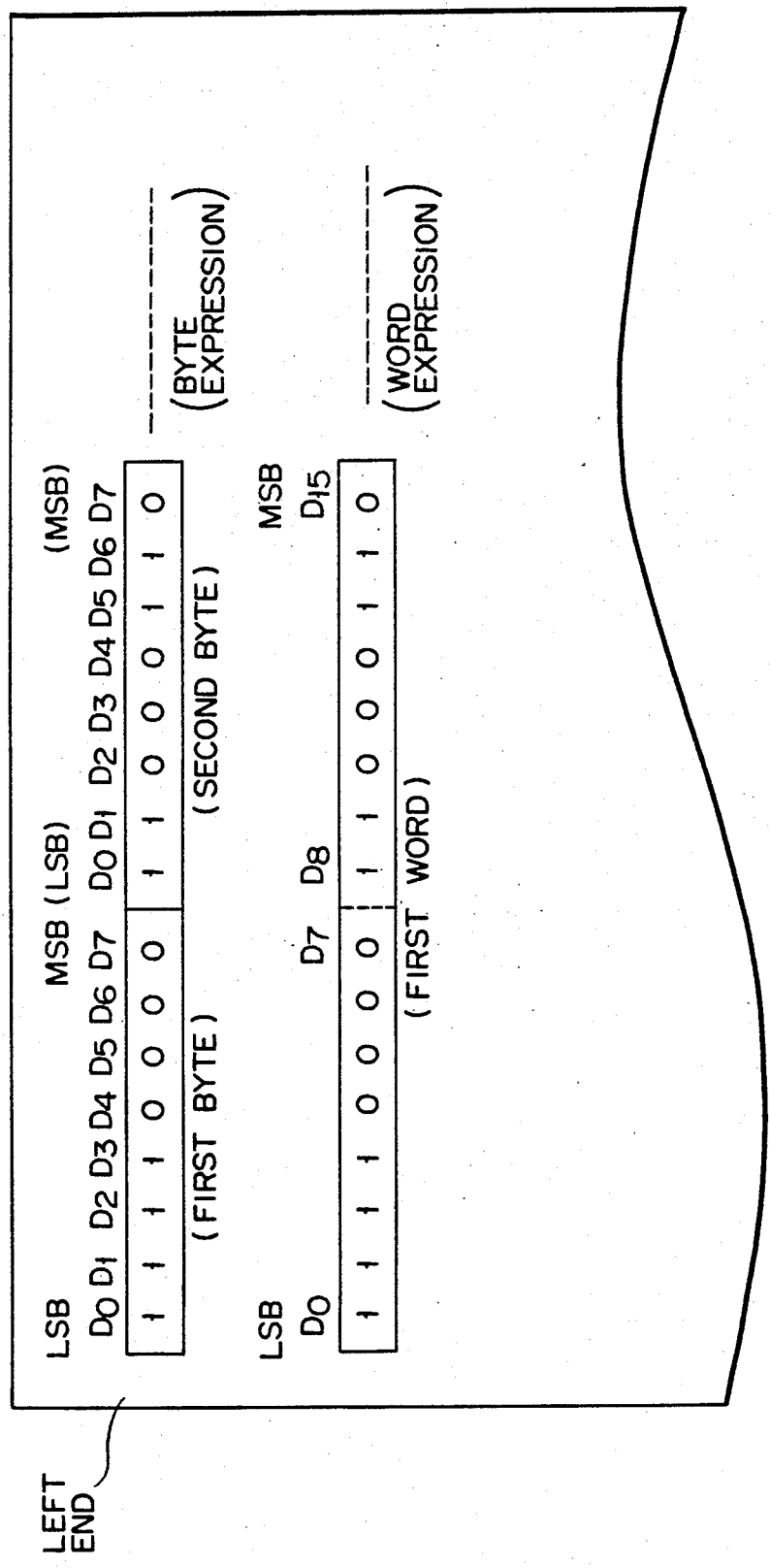
FIG. 7 is a diagram for explaining the way to express image data.

For image data expression in the company A's system, therefore, data and its address in the bit map memory can be viewed identical, as is shown in FIG. 7, thus facilitating data processing. In other words, the relationship between the MSB and the LSB of the address and the relationship between the MSB and the LSB of the data can be treated based on the same concept:

|  | LSB | MSB |
| --- | --- | --- |
| Address: | A0 | A15 |
| Data: | D0 | D15 |

Figure 8:
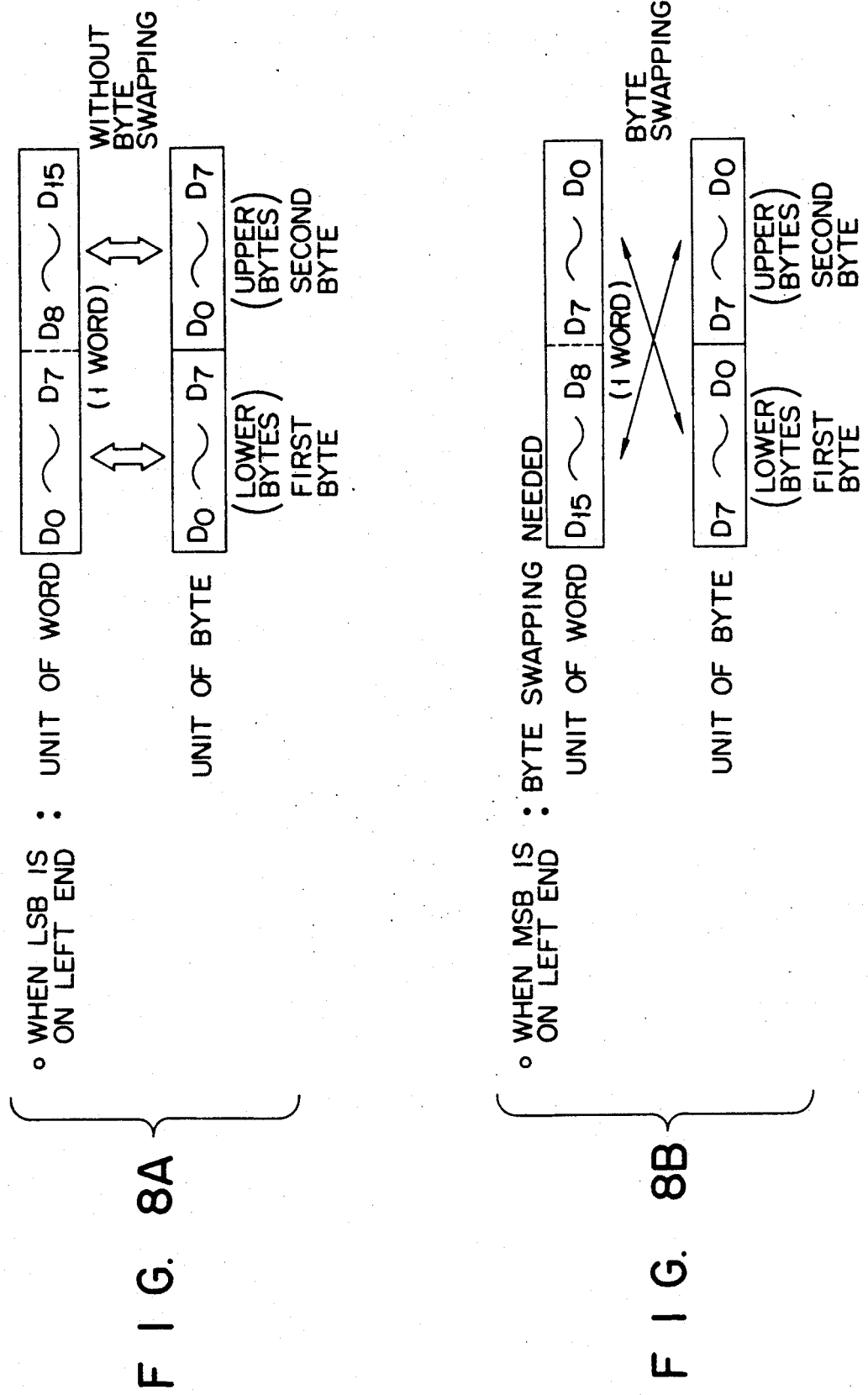
FIGS. 8A and 8B are diagrams for explaining the relationship between data and addresses in a bit map memory.

Further, the unit for data access (byte or word) can be flexibly altered, and no byte swapping is required for the alteration (see FIG. 8A). Furthermore, data transmission in this system conforms to the image data transmission definition in a communication system. That is, the transmission principle in this system that data is transmitted in the order scanned by scanner 20 conforms to the communication standard that an ordinary transmission LSI transmits data from the LSB.

In a case where image processing module 30 accesses to page memory 14 through image bus 42, the data access can be done with the above definition and without byte swapping.

In a case where CPU 12 accesses to page memory 14, however, byte swapping is required because of the architecture of CPU 12 (see FIG. 8B). In this case, such byte swapping is carried out by a byte swapping circuit (not shown) provided in memory module 10.

Figure 9:
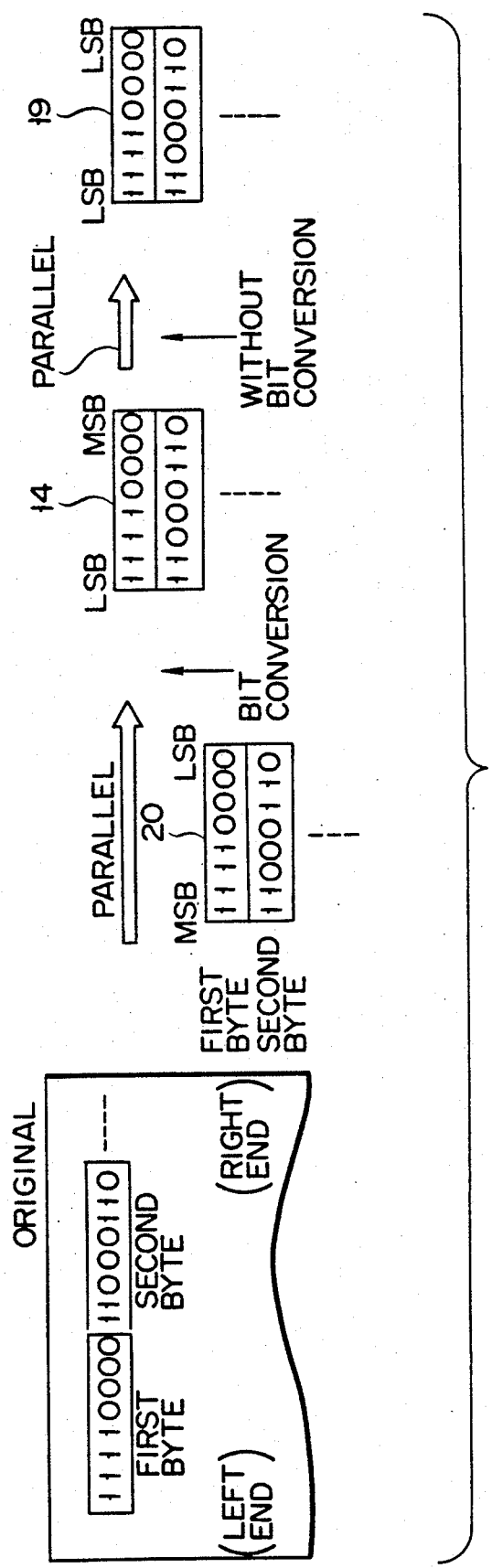
FIGS. 9 and 10 are diagrams for explaining the operation of the individual bit converters in a system of company A.
Figure 10:
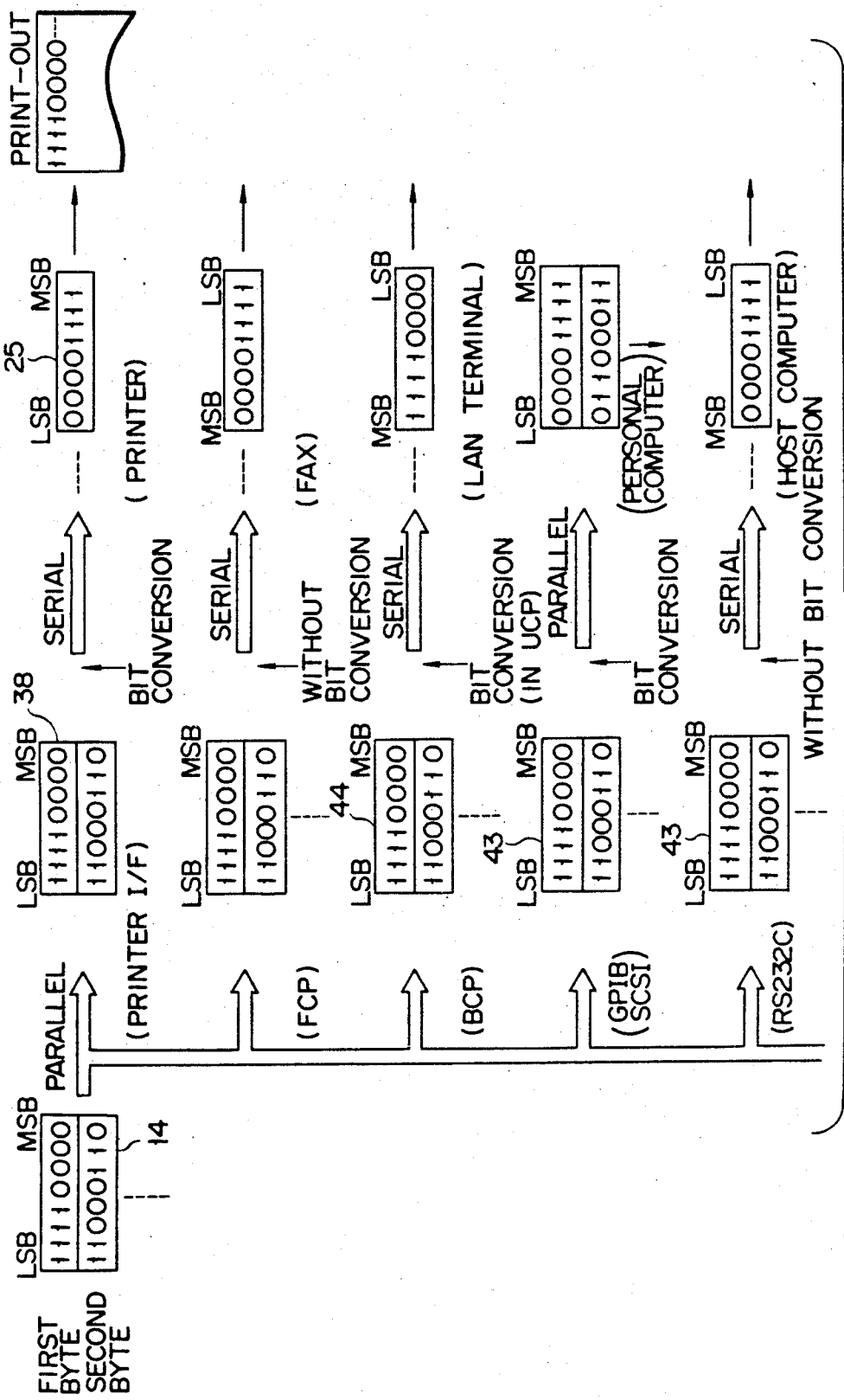

Referring now to FIGS. 9 and 10, the operation of thus structured apparatus will be described on the assumption that the company A's system is coupled with company B's scanner 20 and printer 25, optical disk 19, a LAN terminal, and an external unit, all of the latter four units being products of company A.

To begin with, a description is given of the operation involved in displaying image information scanned by scanner 20 on CRT display device 24. An operator sets an original on an original table (not shown) of scanner 20. Scanner 20 executes two-dimensional scanning of the original to provide image information. This image information is supplied to scanner interface 37 which in turn converts the received byte-by-byte data in bit converter 37a, as is shown in FIG. 9. For instance, the first byte data "$M_1S_1{}^B1100{}^LOS_0{}^B$" is converted to "$L_1S_1{}^B1100{}^MOS_0{}^B$" and the second byte data "$M_1S_1{}^B0001{}^LS_0{}^B$" is converted to "$L_1S_1{}^B0001{}^MS_0{}^B$".

The converted data is supplied over image bus 42 to page memory 14 through vertical/horizontal converter 35 and magnification/reduction circuit 34. As a result, the image of the original scanned by scanner 20 is stored in page memory 14 after undergoing the bit conversion.

The image information stored in page memory 14 is then supplied over image bus 42 to display memory 15. Accordingly, the image information stored in display memory 15 is supplied to CRT display device 24 through display controller 16. Consequently, the image information scanned by scanner 20 is displayed on CRT display device 24.

A description will now be given of the operation involved in recording image information thus stored in page memory 14 on optical disk 19 by optical disk device 22. With the image information from scanner 20 being stored in page memory 14, when data recording is instructed, this image information is supplied over image bus 42 to magnification/reduction circuit 34 and vertical/horizontal converter 35. The image information processed in the circuit 34 and converter 35 is then supplied to CODEC 36, which in turn compresses the received information without executing bit conversion in its bit converter 36a. The compressed image information is supplied over image bus 42 to buffer memory 14a through magnification/reduction circuit 34 and vertical/horizontal converter 35. The image information stored in buffer memory 14a is supplied through interface circuit 17 to optical disk device 22 which in turn stores the received image information on optical disk 19. For instance, the first byte data "$L_1S_1{}^B1100{}^MOS_0{}^B$" and the second byte data "$L_1S_1{}^B0001{}^MS_0{}^B$" are stored as they are (or without bit conversion) on optical disk 19.

A description will now be given of the operation involved in printing out image information, thus stored in page memory 14, through printer 25. With the image information from scanner 20 being stored in page memory 14, when data printing is instructed, this image information is supplied over image bus 42 to magnification/reduction circuit 34 and vertical/horizontal converter 35. The image information processed in the circuit 34 and converter 35 is then supplied to printer interface 38. Printer interface 38 executes bit conversion to the received information in its bit converter 38 as is shown in FIG. 10. The bit converted image information is supplied to printer 25. Printer 25 prints out the received image information. For instance, in bit converter 38a, the first byte data "$L_1S_1{}^B1100{}^MOS_0{}^B$" is converted to "$L_0S_0{}^B001{}^MS_1{}^B1$"and the second byte data $L"S_1{}^B10001{}^MS_0{}^B$" are converted to $L"S_0{}^B11000{}^MS_1{}^B$".

A description will now be given of the operation involved in transmitting image information, thus stored in page memory 14, to a LAN terminal. With the image information from scanner 20 being stored in page memory 14, when data transmission to the LAN terminal is instructed, this image information is supplied over image bus 42 to magnification/reduction circuit 34 and vertical/horizontal converter 35. The image information processed in the circuit 34 and converter 35 is then supplied to CODEC 36, which in turn compresses the received information. The compressed image information is supplied over image bus 42 to buffer memory 14a through magnification/reduction circuit 34 and vertical/horizontal converter 35. The image information stored in buffer memory 14a is supplied to UCP 43 which in turn subjects the received image information to bit conversion for each byte in bit converter 43a and then transmits the information the LAN terminal through BCP 44.

A description will now be given of the operation involved in transmitting image information, thus stored in page memory 14, to an external unit (not shown) such as a personal computer or a host computer. With the image information from scanner 20 being stored in page memory 14, when data transmission to an external unit is instructed, this image information is supplied over image bus 42 to magnification/reduction circuit 34 and vertical/horizontal converter 35. The image information processed in the circuit 34 and converter 35 is then supplied to CODEC 36. CODEC 36 in turn compresses the received information without executing bit conversion when the specified external unit is a host computer (RS-232C), and compresses the image information with bit conversion when the external unit is a personal computer (GPIB, SCSI). The compressed image information is supplied over image bus 42 to buffer memory 14a through magnification/reduction circuit 34 and vertical/horizontal converter 35. The image information stored in buffer memory 14a is transmitted through UCP 43 to the external unit.

The above operations can also apply to displaying the image information read out from optical disk 19 on CRT display device 24, printing out the information through printer 25, or transmitting it to a LAN terminal or an external unit such as a FAX. In accordance with the machine architectures, however, the necessary bit conversion should be executed in the respective bit converters.

More specifically, the image information read out from optical disk 19 is stored in page memory 14 without bit conversion, and is then displayed on CRT display device 24. In providing a print-out from printer 25, the image information from page memory 14 is subjected to bit conversion in bit converter 38a of printer interface 38 and sent to printer 25. In transmitting image information to a LAN terminal, the image information from page memory 14 is subjected to bit conversion in bit converter 43a of UCP 43 before sent to the LAN terminal. For information transmission to an external unit such as a FAX through the FCP, the image information from page memory 14 is transmitted to the external unit without bit conversion.

The above operations can also apply to displaying the image information from a LAN terminal on CRT display device 24, printing it out through printer 25, or recording it on optical disk 19. In these cases, the necessary bit conversions should be also executed i the respective bit converters in accordance with the machine architectures.

More specifically, the image information supplied from a LAN terminal is stored in page memory 14 after undergoing bit conversion in bit converter 43a of UCP 43, and is subjected to data expansion, etc. and is then displayed on CRT display device 24. In providing a print-out from printer 25, the image information from page memory 14 is subjected to bit conversion in bit converter 38 of printer interface 38 and sent to printer 25 for the task. In recording image information on optical disk 19, the image information from page memory 14 is supplied to optical disk device 22 without bit conversion.

The above operations can also apply to displaying the image information supplied from an external unit, such as a FAX, on CRT display device 24, printing out the information through printer 25, or recording it on optical disk 19. In these cases, however, the necessary bit conversions should be executed in the respective bit converters in accordance with the machine architectures.

More specifically, the image information supplied from an external unit (FAX, etc.) is stored in page memory 14 without bit conversion, is subjected to data expansion, etc. and is then displayed on CRT display device 24. In providing a print-out from printer 25, the image information from page memory 14 is subjected to bit conversion and sent to printer 25. In recording image information on optical disk 19, the image information from page memory 14 is sent to optical disk device 22 without bit conversion.

The same operations can apply to the case where the company A's system is coupled with other devices (products of companies A and B). However, the necessary bi conversions should be executed in accordance with the machine architectures (difference in machine specifications).

Figure 11:
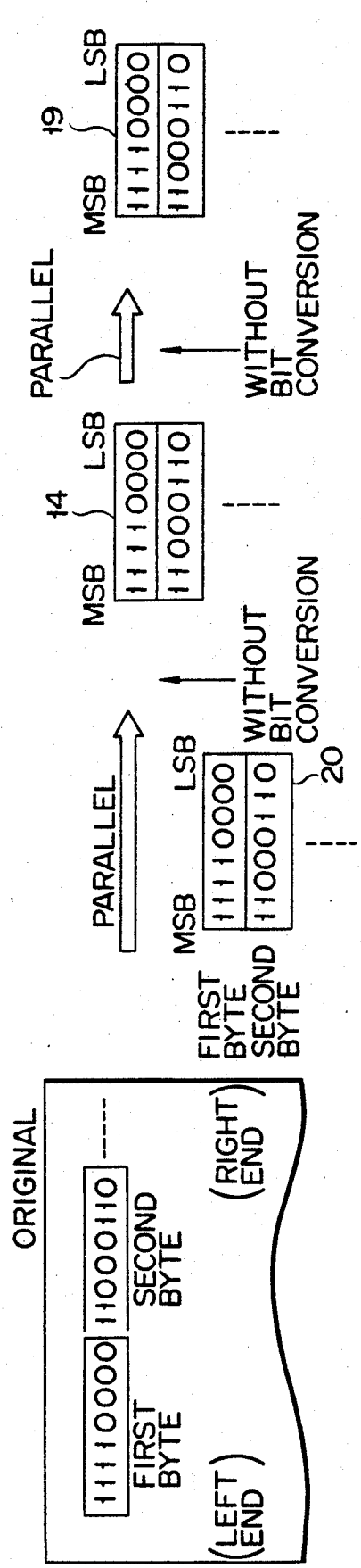
FIGS. 11 and 12 are diagrams for explaining the operation of the individual bit converters in a system of company B.
Figure 12:
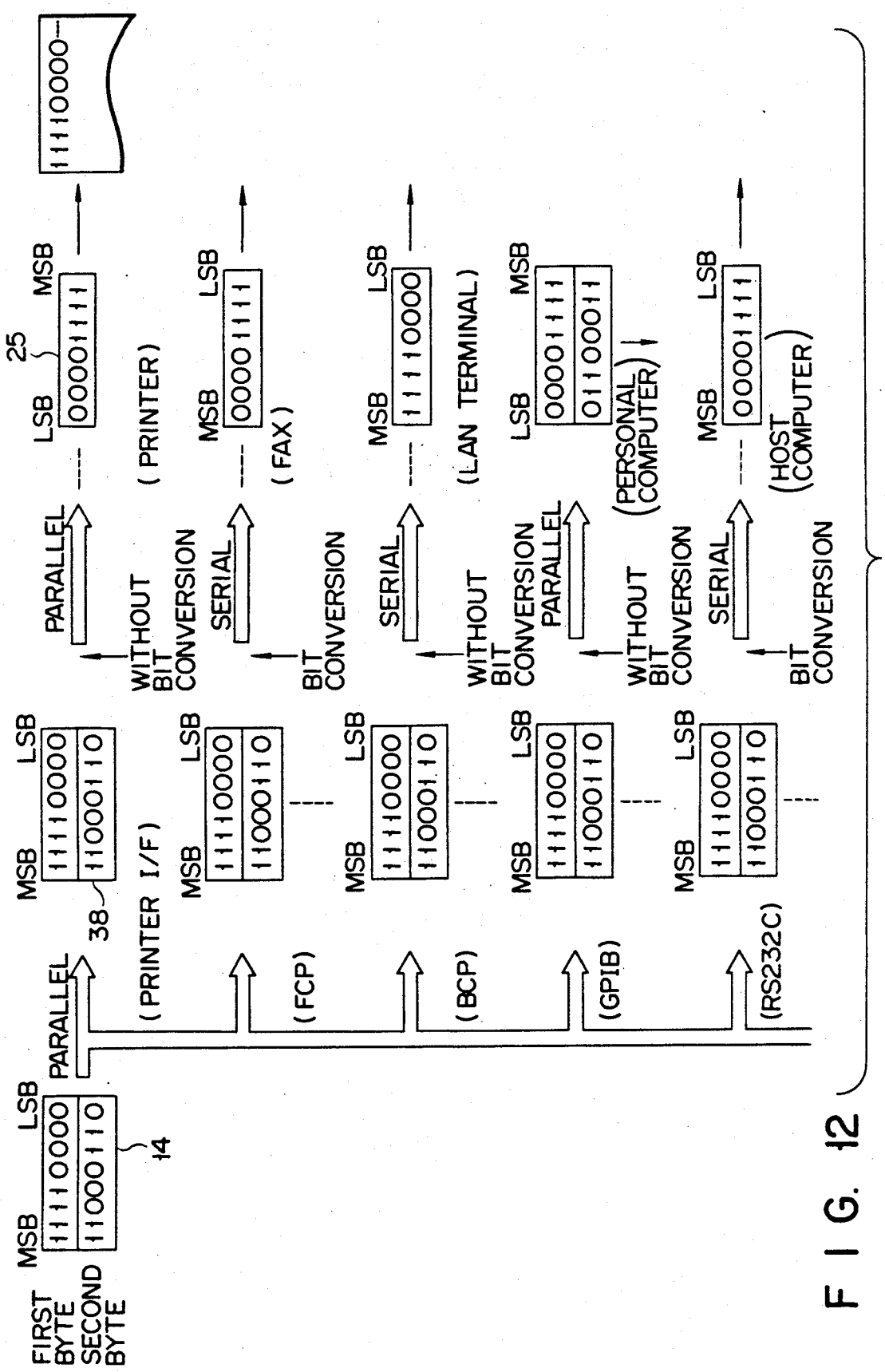

The same operations can apply to the case where the company B's system is coupled with various devices (see FIGS. 2, 11, and 12) and devices which have a different specification even if the devices are products of the company B. However, the necessary bit conversions should be executed in accordance with the machine architecture.

As described above, bit converter 36a is provided in CODEC 36, and the necessary bit conversions are executed in accordance with the type of an involved optical disk and/or the types of devices coupled to the present apparatus for data storage/reproduction purpose. In addition, bit converter 43a is provided in communication control module 31, and the necessary bit conversions are executed in accordance with the type of a system coupled to the present apparatus for data transmission/reception. Accordingly, even if the type of the optical disk differs from that of the present apparatus, data registering and retrieval can be performed to thereby facilitate data processing, the bit arrangement of data and its address in the bit map memory can be set identical, and the present apparatus can conform to the standards of communication systems, and keep compatibility with different type of devices and recording mediums as well as expandability to permit connection to various communication devices.

Bit converters 37a and 38a are respectively provided in interfaces 37 and 38, and the necessary bit conversions are executed in accordance with the types of involved input/output devices, such as scanner 20 and printer 25, and/or the types of devices coupled to the present apparatus for data scanning and data printing. Accordingly, even if the types of input/output devices such as a scanner and a printer differ from that of the present apparatus, data scanning, printing, registering and retrieval can be performed and compatibility with other type of devices and recording mediums can be maintained.

Although the foregoing description of the embodiment has been given with reference to an optical disk serving as a recording medium, this invention is not limited to this particular recording medium. The recording medium may be an optical memory card or a laser card.

Although the description has been given with reference to bit converter 43a provided in UCP 43 of communication control module 31, this invention is not limited to this particular case; such a bit converter may be provided in BCP 44 instead.

With an optical disk in use, some bit conversion may be involved between an optical disk medium and an optical disk drive. Specifically, bit conversion is required in CODEC 36 in a case where data from an optical disk which has been recorded by an optical disk device in a company B's system is reproduced by an optical disk drive in a company A's system and stored in a page memory. In this case, whether or not the bit conversion is executed has only to be determined, based on medium identification carried on the optical disk medium and in the optical disk drive (as to whether the optical disk medium is a product of company A or company B). This provides a new merit of ensuring compatibility of an optical disk medium between apparatus or between systems.

What is claimed is:

1. An information processing apparatus comprising:
   first interface means to which one of at least a first apparatus and a second apparatus is coupled selectively, said first apparatus having first means for providing information having units of data of a predetermined plurality of bits in a predetermined first order and said second apparatus having second means for providing information having units of data of said predetermined plurality of bits in a predetermined second order different from said first order;
   second interface means to which one of at least a third apparatus and a fourth apparatus is coupled selectively, said third apparatus having first means for transmitting information having units of data of said predetermined plurality of bits in said first order and said fourth apparatus having second means for transmitting information having units of data of said predetermined plurality of bits in said second order; and
   control means for receiving and subjecting information to a predetermined process, supplying processed information to said first means for transmitting of said third apparatus selectively coupled to said second interface means therethrough in units of data of said predetermined plurality of bits in said first order when said second apparatus is coupled to said first interface means and said third apparatus is coupled to said second interface means, and supplying said procsesed information to said second means for transmitting of said fourth apparatus selectively coupled to said second interface means therethrough in units of data of said predetermined plurality of bits in said second order when said first apparatus is coupled to said first interface means and said fourth apparatus is coupled to said second interface means;
   said control means includes means for discriminating between said first apparatus and said second apparatus selectively coupled to said first interface means and between said third apparatus and said fourth apparatus selectively coupled to said second interface means;
   said control means further includes means for supplying information to said first means for transmitting of said third apparatus via said second interface means in units of data of said predetermined pluraliyt of bits in said first order when said second apparatus is discriminated as being coupled to said first interface means and said third apparatus is discriminated as being coupled to said second interface means by said discriminating means, and supplying information to said second means for transmitting of said fourth apparatus via said second interface means in units of data of said predetermined plurality of bits in said second order when said first apparatus is discriminated as being coupled to said first interface means and said fourth apparatus is discriminated as being coupled to said second interface means by said discriminating means; and
   said supplying means includes means for converting information in units of data of said predetermined plurality of bits in said first order to said second order by converting data having a bit alignment from a least significatn bit to a most significant bit into data having a bit alignment from said most significant bit to said least significant bit.

2. An information processing apparatus comprising:
   first interface means to which one of at least a first apparatus and a second apparatus is coupled selectively, said first apparatus having first means for providing information having units of data of a predetermined plurality of bits in a predetermined first order and said second apparatus having second means for providing information having units of data of said predetermined plurality of bits in a predetermined second order different from said first order;
   second interface to which one of at least a third apparatus and a fourth apparatus is coupled selectively, said third apparatus having first means for transmitting information having units of data of said predetermined plurality of bits in said first order and said fourth apparatus having second means for transmitting information having units of data of said predetermined plurality of bits in said second order; and
   control means for receiving and subjecting information to a predetermined process, supplying processed information to said first means for transmitting of said third apparatus selectively coupled to said second interface means therethrough in units of data of said predetermined plurality of bits in said first orer when said second apparatus is coupled to said first interface means and said third apparatus is coupled to said second itnerface means, and supplying said processed information to said second means for transmitting of said fourth apparatus selectively coupled to said second interface means therethrough in units of data of said predetermined plurality of bits in said second order when said first apparatus is coupled to said first interface means and said fourth apparatus is coupled to said second interface means;
   said control means includes means for discriminating between said first apparatus and said second apparatus selectively coupled to said first interface means and between said third apparatus and said fourth apparatus selectively coupled to said second interface means;
   said control means further includes means for supplying information to said first means for transmitting of said third apparatus via said second interface means in units of data of said predetermined plurality of bits in said first order when said second apparatus is discriminated as being coupled to sadi first interface means and said third apparatus is discriminated as being coupled to said second interface means by said discriminating means, and supplying information to said second means for transmitting of said fourth apparatus via said second interface means in units of data of said predetermined plurality of bits in said second order when said first apparatus is discriminated as being coupled to said first interface means and said fourth apparatus is discriminated as being coupledt o said second interface means by said discriminating means; and said supplying means includes means for converting information in units of data of said predetermined plurality of bits in said first order to said second order by converting data having a bit alignment from a most significant bit to a least significant bit into data having a bit alignment from said least significant bit to said most significant bit.

3. The apparatus according to claim 1, wherein said control means further includes:

means for processing information having units of data of said predetermined first order; and supply means for supplying information having units of data received in said second order, to said processing means in said first order, when said second apparatus is discriminated as being coupled to said first interface means by said discriminating means.

4. The apparatus according to claim 3, wherein said supply means includes means for converting information in units of data of said predetermined plurality of bits in said second order to said first order by converting data having a bit alignment from a least significant bit to a most significant bit into data having a bit alignment from said most significant bit to said least significant bit.

5. The apparatus according to claim 3, wherein said supply means includes means for converting information in units of data of said predetermined plurality of bits in said second order to said first order by converting data having a bit alignment from a most significant bit to a least significant bit into data having a bit alignment from said least significant bit to said most significant bit.

* * * * *

UNITED STATES PATENT AND TRADEMARK OFFICE
CERTIFICATE OF CORRECTION

PATENT NO. : 5,040,232
DATED : August 13, 1991
INVENTOR(S) : Masayuki Kanno

It is certified that error appears in the above-identified patent and that said Letters Patent is hereby corrected as shown below:

Claim 1, column 11, line 43, change "procsesed" to --processed--.

Claim 1, column 11, lines 60 and 61, change "pluraliyt" to --plurality--.

Claim 1, column 12, line 11, change "significatn" to --significant--.

Claim 2, column 12, line 25, after "interface" insert --means--.

Claim 2, column 12, line 39, change "orer" to --order--.

Claim 2, column 12, line 41, change "itnerface" to --interface--.

UNITED STATES PATENT AND TRADEMARK OFFICE
CERTIFICATE OF CORRECTION

PATENT NO. : 5,040,232
DATED : August 13, 1991
INVENTOR(S) : Masayuki Kanno

It is certified that error appears in the above-identified patent and that said Letters Patent is hereby corrected as shown below:

Claim 2, column 12, line 61, change "sadi" to --said--.

Claim 2, column 13, line 3, change "coupledt o" to --couplted to --.

Signed and Sealed this

Sixth Day of April, 1993

Attest:

STEPHEN G. KUNIN

Attesting Officer

Acting Commissioner of Patents and Trademarks